United States Patent [19]

Berti

[11] 4,332,359
[45] Jun. 1, 1982

[54] TENSIONING MEANS FOR REEL-TO-REEL TAPE TRANSPORTS

[75] Inventor: Eugenio Berti, Falkland, Scotland

[73] Assignee: Burroughs Corporation, Detroit, Mich.

[21] Appl. No.: 223,961

[22] Filed: Jan. 12, 1981

Related U.S. Application Data

[63] Continuation-in-part of Ser. No. 91,440, Nov. 5, 1979, abandoned.

[30] Foreign Application Priority Data

Nov. 28, 1978 [GB] United Kingdom ............... 46352/78

[51] Int. Cl.³ .......................... G03B 1/04; G11B 15/32
[52] U.S. Cl. .................................................. 242/203
[58] Field of Search ................................ 242/186–190, 242/201–204, 75.51; 318/6, 7; 360/73, 74.3, 71

[56] References Cited

U.S. PATENT DOCUMENTS

| | | | |
|---|---|---|---|
| 2,941,736 | 6/1960 | Ellmore | 242/204 |
| 2,985,395 | 5/1961 | Hoehn et al. | 242/204 |
| 4,256,996 | 3/1981 | Brooks et al. | 318/7 |

*Primary Examiner*—Leonard D. Christian
*Attorney, Agent, or Firm*—David G. Rasmussen; Kevin R. Peterson; Edmund M. Chung

[57] ABSTRACT

A reel-to-reel tape drive system is disclosed in which primary control signals are applied to motors to drive both the payout and takeup reels and in which secondary control signals are provided to first and second torque driving circuits which, responsive to the secondary control signals, continuously provide first and second tensioning control signals to the first and second reel motors respectively. The first and second tensioning control signals operate to activate the first and second reel motors to take up slack and provide tension in the tape when the first and second reel motors are not receiving primary control signals. Thus, slack is taken up when the reels are stopped and adequate tension is supplied prior to restart, enhancing starting and stopping performance of the tape transport mechanism.

4 Claims, 4 Drawing Figures

TENSIONING MEANS FOR REEL-TO-REEL TAPE TRANSPORTS

CROSS-REFERENCE TO RELATED APPLICATIONS

This application is continuation-in-part of application Ser. No. 091,440 filed Nov. 5, 1979 and now abandoned.

FIELD OF THE INVENTION

The present invention relates to an apparatus for recording and reproducing information on tape. The invention is particularly directed towards a technique for increasing the capacity of a tape store by enabling the data to be recorded in a plurality of closely spaced blocks along the length of the tape.

DESCRIPTION OF THE PRIOR ART

Magnetic tape is commonly used for recording retrievable informational data in computer and other data processing systems. It is usual practice to record data in a plurality of separate data blocks, along the length of the tape. It is also usual that a tape drive be required to locate, and operate on, individual data blocks. In some circumstances the tape drive is required to access adjacent data blocks, one by one, along the length of the tape, stopping between blocks. In order to meet this requirement, the tape drive must be capable of stopping and starting the tape between data blocks.

A factor limiting the information storage capacity of the tape is the length of tape wasted between data blocks. The length of tape passing adjacent to the head as the drive brings the tape up to operating speed is known as the start distance. The length of tape passing adjacent to the head as the drive brings the tape from operating speed to a halt is known as the stop distance. The distance between adjacent blocks of data on the tape, known as the interrecord gap, must equal or exceed the sum of the start distances and the stop distances to ensure that data blocks may pass adjacent to the head only when the tape is at operating speed. The length of tape in the interrecord gap being unusable for data storage, the short data blocks being used, the proportion of the length of the tape lost to interrecord gaps becomes significant, and the data storage capacity of the tape is impaired.

It is important to the efficient use of tape, that starting and stopping of the tape be executed using the shortest length of tape possible. With the general abandonment of the older art of capstan drives, because of tape wear and capstan inertia problems, it has become usual to separately couple each of the two tape storage reels of the tape drive to two motors, each motor causing its respective reel to rotate, and by monitoring the rotational speed of the motors through a servo control system, responsive to a tape drive controller, cause the tape to move in a controlled fashion from reel to reel, passing, in transit, adjacently to the head. Such a system, lacking a capstan, is known as a reel-to-reel tape transport.

While the reel-to-reel tape drive offers considerable advantages over the former capstan driven tape transports, in terms of rapidity of response and low tape wear, it suffers from tape tension problems not unknown in the earlier capstan drives.

As the tape comes to a stop, it is frequently the case that the tape storage reel, paying out the tape, overruns, leaving slack tape between the two tape storage reels. On restart, the servo control system must take up the slack tape before proper motion can be established. In the presence of slack tape, or even tape lacking sufficient tension, much hunting and bouncing occurs, because of storage reel inertia and tape elasticity, before the servo control system gains normal operation. The extra time required for these transient, unwanted motions to cease, ensures that more tape than necessary passes the head before the tape aquires uniform operational speed.

Previous methods of overcoming this problem have involved relatively complicated stopping and starting control sequences being impressed on the tape speed servo control system by the tape drive controller. Such measures as ramping up and down of the speed demand to the servo, and the use of controlled, timed sequences of torques being applied to the motors, have been employed. While these measures ameliorate or even eliminate the condition, they suffer from the disadvantage that the system response is thereby made less rapid and its control more complicated than if the tape speed servo control system were able to operate in the absence of the unwanted transients, caused by slack tape or tape lacking sufficient tension.

SUMMARY OF THE INVENTION

The invention involves a tape drive system for driving payout and takeup tape storage reels. More specifically the invention involves a way of applying tension to the tape to reduce the length of the starting and stopping zones between blocks of data on the tape and hence increases its data capacity.

First and second reel drive motors are mechanically coupled respectively, to the payout and takeup tape storage reels. The reel drive motors are controlled by signals from a reel motor control circuit. The reel motor control circuit also provides signals to first and second torque driving circuits. These two circuits are connected to the first and second reel drive motor respectively. The two torque driving circuits provide first and second tensioning control signals to the first and second reel drive motors. The tensioning signals are provided to the reel drive motors when the reel drive motors are at rest and not receiving a signal from the reel motor control circuit. The tensioning signals activate the reel drive motors enough to move in opposition and take up any slack in the tape.

To prevent the tape from moving in the head a means of applying a frictional force to the tape, such as a head and a head friction pad, is used. The friction force provided will not be overcome by the reel drive motors activated by the tensioning signals.

The novel feature of the invention is the use of the first and second torque driving circuits.

DESCRIPTION OF THE PREFERRED EMBODIMENT

Figure 1:
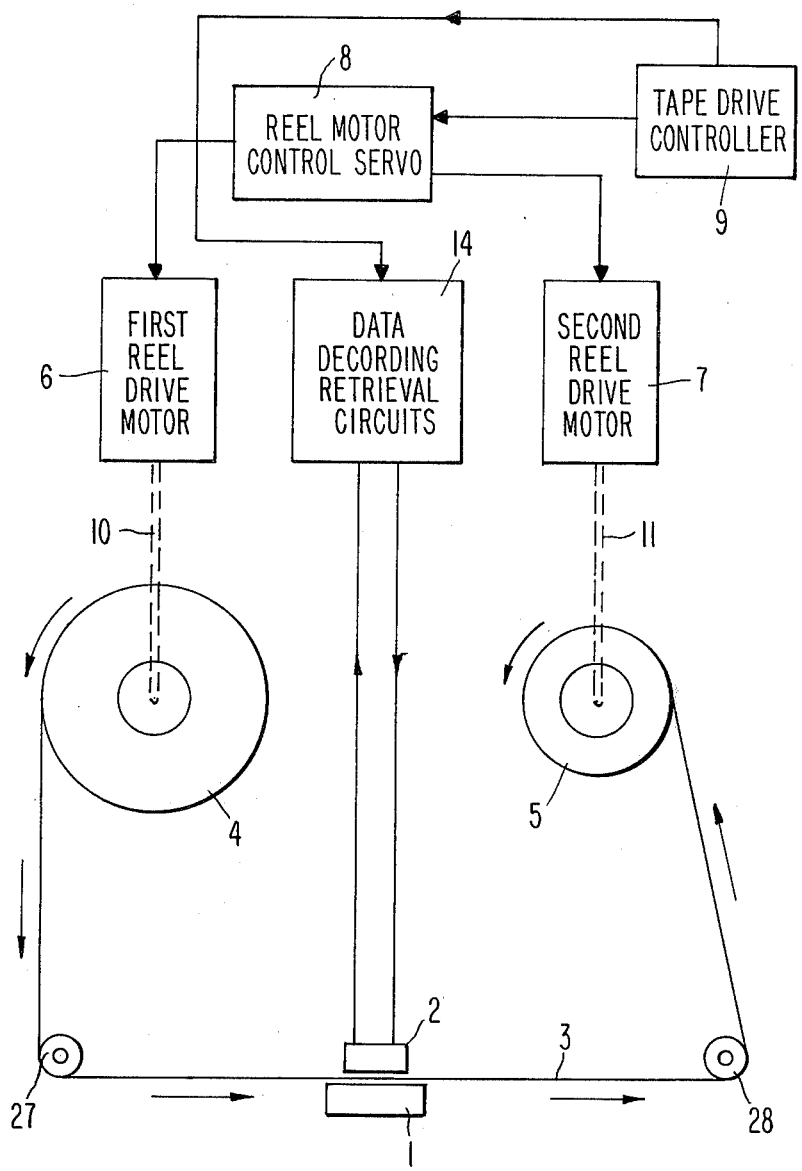
FIG. 1 is a block diagram which shows the prior art system of a reel-to-reel tape drive for retrievable informational data storage.

Figure one shows the prior art reel-to-reel tape drive where paying-out tape reel (4) sends tape (3) over the first idler pulley (27), between the head (2) and head friction pad (1), over the second idler pulley (28) to the tape-up tape reel (5). The direction of the tape (3) being reversible with a corresponding reversal of the roles of the two tape reels (4 & 5). The head (2) receives data to record, and sends readback signals to, the data recording and data retrieval circuits (14). The paying out reel (4) is coupled to the first reel driving motor (6) by the first mechanical coupling (10), the reel (4) being caused to rotate about its centre. The taking-up reel (5) is coupled to the second reel driving motor (7) by the second mechanical coupling (11) the reel (5) also being caused to rotate about its centre. Both reel drive motors (6 & 7) are responsive to the outputs of the reel motor control servo (8). Both the reel motor control servo (8) and the data recording and data retrieval circuits (14) are responsive to the tape drive controller (9) which in its turn is responsive to commands from the host system.

Figure 2:
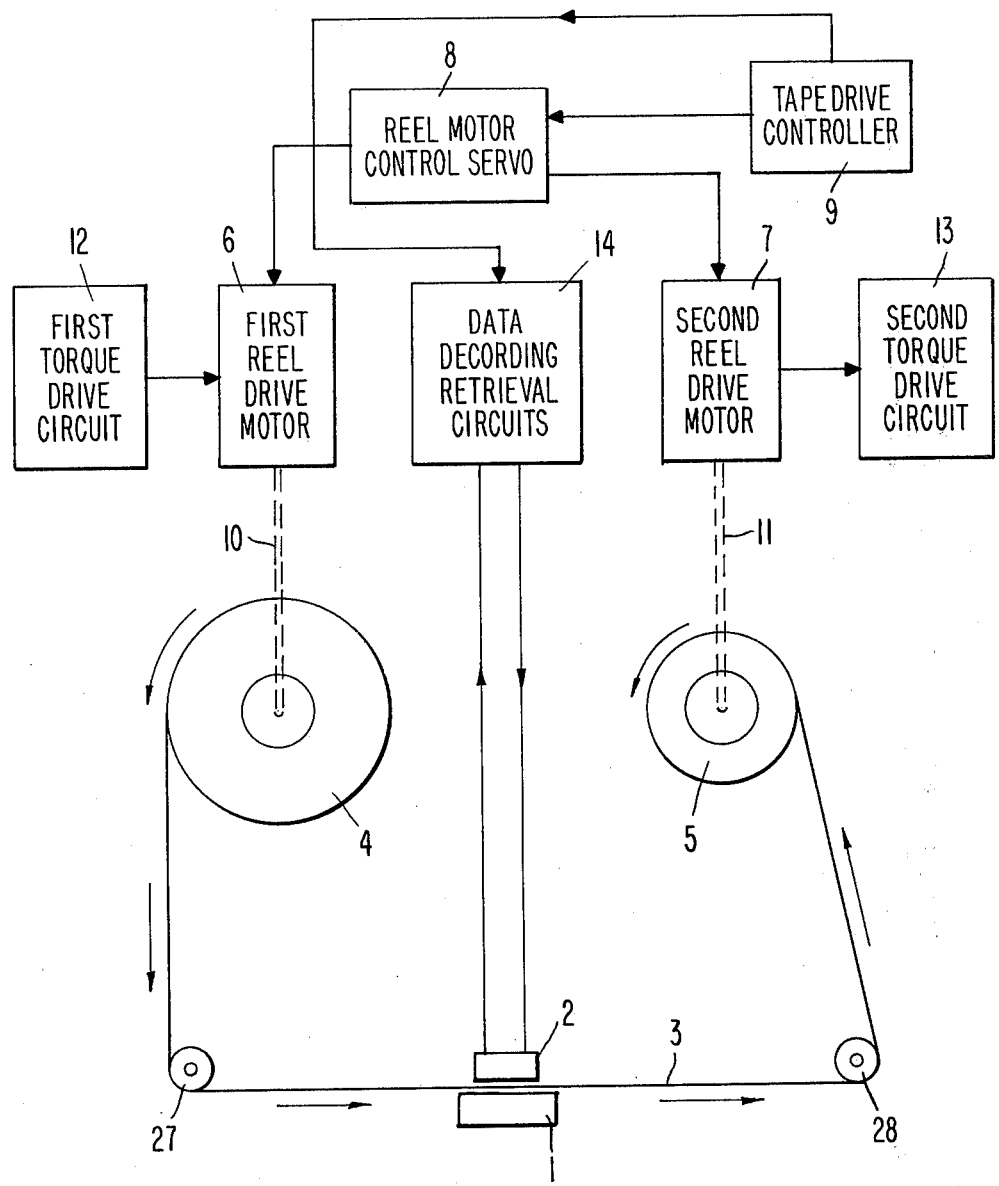
FIG. 2 is a block diagram which shows the systems reflecting the preferred embodiment of the present invention, showing additions over the system of FIG. 1.

FIG. 2 shows the system of the preferred embodiment of the present invention. It is identical to and operates in the same manner as the system of the prior art shown in FIG. 1, with the exception of the addition of torque driving circuits (12 & 13) to the reel drive motors (6 & 7) the output of the torque drive circuits (12 & 13) being additional to the outputs to the reel motors (6 & 7) from the reel motor control servo (8).

Figure 3:
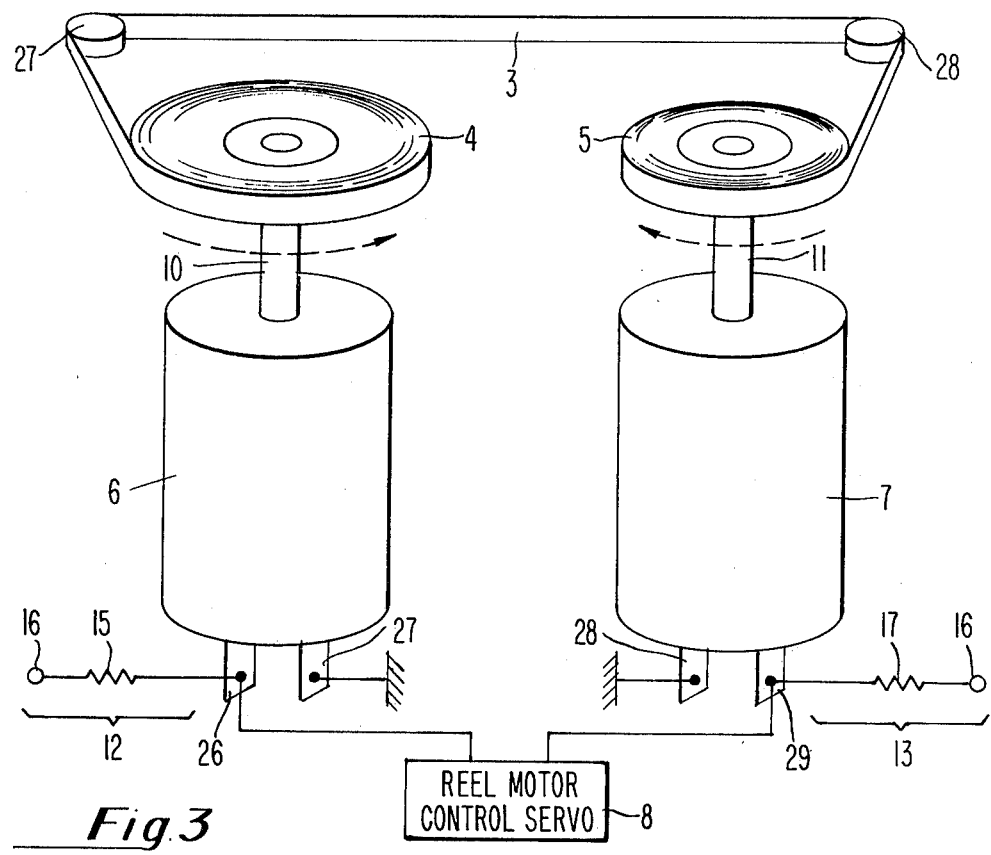
FIG. 3 is a block diagram which shows the particular details of the additions of the preferred embodiment over the normal system of FIG. 1, in the form of two resistors connected between power supplied and motors.

The first torque driving circuit (12) drives the first reel motor (6) and the second torque driving circuit (13) drives the second reel drive motor (7). The torque applied to each motor by the torque drive circuits (12 & 13) is insufficient to interfere with the normal operation of the tape drive, but sufficient to take up any slack tape and establish adequate tension in the tape (3) when the tape is not moving and normal drive to the reel drive motors (6 & 7) from the reel motor control servo (8) is relaxed. FIG. 3 shows the implementation of the torque drive circuits (12 & 13) additional to the prior art system and first shown in FIG. 2.

Resistor, 15, connected to the tape drive power supply at the point 16, is connected at its other end to the active terminal (26) of the first reel drive motor (6). The inactive terminal (27) of the first reel drive motor (6) is connected to the ground return of the tape drive power supply. Resistor, 15, connected at one end to the tape drive power supply, constitutes the first torque drive circuit (12) shown in FIG. 2.

Resistor 17, connected to the tape drive power supply at the point 18, is connected at its other end to the active terminal (29) of the second reel drive motor (7). The inactive terminal (28) of the second reel drive motor (7) is connected to the ground return of the tape drive power supply. Resistor, 17, connected at one end to the tape drive power supply, constitutes the second torque drive circuit (13) shown in FIG. 2.

The direction of the torques applied by the torque drive circuits (12 & 13) is that shown by the dotted arrows around the reels (4 & 5) in FIG. 3. These applied torques are small enough not to impede the action of the reel motor control servo (8). The reel motor control servo (8) has its outputs to the individual reel drive motors (6 & 7) connected respectively in parallel with the torque drive circuits (12 & 13). While the reel motor control servo (8) is required by the tape drive controller (9) to move the tape (3) it readily overcomes the low levels of drive applied to the reel drive motors (6 & 7) by the torque drive circuits (12 & 13).

Figure 4:
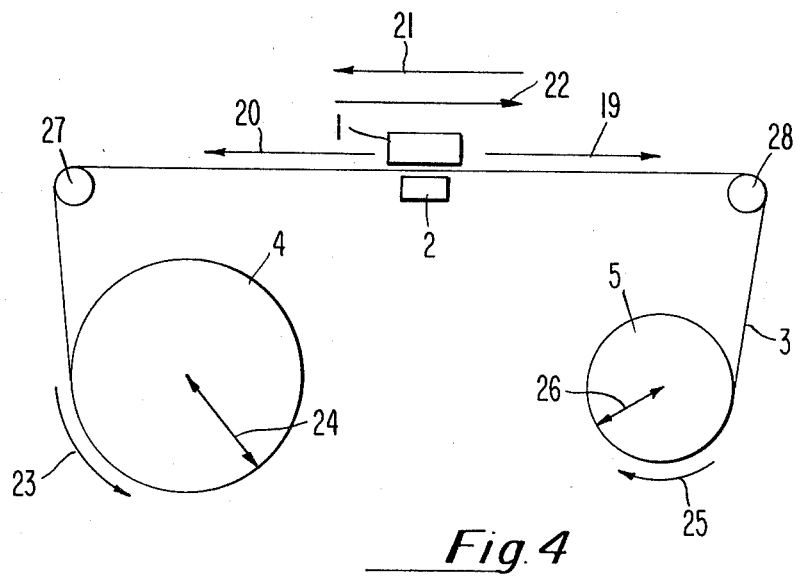
FIG. 4 is a block diagram which shows the balance of frictional and tensional forces which allow the tape to stay still under the applied tension.

Having responded to commands from the tape drive controller (9) to cause the tape (3) to stand still, the reel motor control servo (8) removes all drive from the reel drive motors (6 & 7). The outputs of the torque drive circuits (12 & 13) then become dominant, pulling on the tape (3) in opposite directions, so taking up any slack tape and establishing adequate tension in the tape (3) to ensure a smooth startup at a subsequent time. In order that the tape, 3, will not move when the reel motor control servo (8) has ceased all drive to the reel drive motors (6 & 7) and the tape (3) is required to stand still, the balance of torques and tensions shown in FIG. 4 must be observed.

With a torque (23) applied by the first reel drive motor (6) to the first reel (4), the tension (20) in the tape to the left of the head (2) will be the torque applied to the first reel drive motor (6), divided by the radius of the first reel (24). Similarly the tension (19) in the tape to the right of the head (2) will be the torque (25) applied by the second reel drive motor (7) to the second reel (5), divided by the radius (26) of the second reel. A net force trying to move the tape (3) one way or the other, equal to the difference between the tension to the left of the head (20) and the tension to the right of the head (19) is countered by frictional forces (21 & 22) acting on the tape lying between the head (2) and the head friction pad (1). Provided the difference in tensions (20 & 19) is less than the frictional forces, (21 & 22), the tape does not move. The preferred embodiment employs a closed cassette to hold the tape, the tape storage reels (6 & 7) and the idler pulleys (27 & 28) being within the body of the cassette.

I claim:

1. A reel-to-reel tape drive system for driving payout and takeup reels comprising:

first and second reel driving means mechanically coupled to said payout and takeup reels respectively for driving said payout and takeup reels;

a reel driving means control circuit for applying primary control signals to said first and second reel driving means and for generating secondary control signals;

a first torque driving circuit responsive to said secondary control signals for continuously providing a first tensioning control signal to said first reel driving means, said first tensioning control signal being insufficient in magnitude when compared to said primary control signals to substantially affect the movement of said payout reel when said first reel driving means is receiving primary control signals but sufficient in magnitude to activate said first reel driving means to take up slack and provide tension in said tape when said first reel driving means is not receiving primary control signals; and a second torque driving circuit responsive to said secondary control signals for continuously providing a second tensioning control signal to said second reel driving means, said second tensioning control signal being insufficient in magnitude to when compared to said primary control signals to substantially affect the movement of said takeup reel when said second reel driving means is receiving primary control signals but sufficient in magnitude to activate said second reel driving means to take up slack and provide tension in said tape when said second reel driving means is not receiving primary control signals.

2. An apparatus according to claim 1 further comprising holding means for securing said tape in place at a point between said payout and takeup storage reels when said first and second reel driving means are not receiving primary control signals.

3. An apparatus according to claim 2 wherein said holding means comprises means for providing a frictional force on said tape in the region between said first and second reel driving means, said frictional force having a magnitude greater than the net driving force on said tape occurring when said first and second tensioning control signals are being applied to said first and second reel driving means respectively and less than the net force on said tape occurring when said primary drive signals are being supplied to said first and second reel driving means.

4. An apparatus according to claim 3 wherein said first and second torque driving circuits each comprise a resistor connected between said reel driving means control circuit and said first and second reel driving means respectively.

* * * * *